United States Patent
Ko (10) Patent No.: US 8,456,760 B2
(45) Date of Patent: Jun. 4, 2013

(54) LENS SYSTEM WITH HIGH RESOLUTION, LOW CHROMATIC ABERRATION, AND LONG FLANGE BACK

(75) Inventor: Chun-Cheng Ko, Tu-Cheng (TW)

(73) Assignee: Wcube Co., Ltd., George Town (KY)

( * ) Notice: Subject to any disclaimer, the term of this patent is extended or adjusted under 35 U.S.C. 154(b) by 160 days.

(21) Appl. No.: 13/036,019

(22) Filed: Feb. 28, 2011

(65) Prior Publication Data

US 2012/0162785 A1 Jun. 28, 2012

(30) Foreign Application Priority Data

Dec. 28, 2010 (TW) ................................. 99146197 A (51) Int. Cl.
*G02B 13/18* (2006.01)
*G02B 9/12* (2006.01)

(52) U.S. Cl.
USPC .......................................... 359/716; 359/791

(58) Field of Classification Search
USPC ................................................. 359/791, 716
See application file for complete search history.

(56) References Cited

U.S. PATENT DOCUMENTS

| 6,992,840 B2 * | 1/2006 | Takeuchi et al. .............. 359/791 |
| 7,064,905 B2 * | 6/2006 | Murakami et al. ............ 359/784 |

* cited by examiner

*Primary Examiner* — Scott J Sugarman
(74) *Attorney, Agent, or Firm* — Altis Law Group, Inc.

(57) ABSTRACT

A lens system includes a first, a second and a third lenses, and an image plane. The lens system satisfies the formulae: FB/TTL>0.30; G1R2/F1>19.54; and D1/D2<1.62. FB denotes a distance between a nearest point of an image-side surface of the third lens relative to the image plane and the image plane, TTL denotes the total track length of the lens system, G1R2 denotes the curvature radius of the vertex of an image-side surface of the first lens, F1 denotes the focal length of the first lens. D1 denotes an orthogonal distance between a farthest point of an image-side surface of the second lens relative to an optical axis of the lens system and a central point of the image-side surface of the second lens, along a direction substantially perpendicular to the optical axis. D2 denotes an orthogonal distance between the farthest point and the central point along the optical axis.

5 Claims, 11 Drawing Sheets

LENS SYSTEM WITH HIGH RESOLUTION, LOW CHROMATIC ABERRATION, AND LONG FLANGE BACK

BACKGROUND

1. Technical Field

The disclosure relates to lenses and, particularly, to a lens system with high resolution, low chromatic aberration, and long flange back.

2. Description of Related Art

A size of an image sensor, such as a complementary metal oxide semiconductor device (CMOS) decreases with development of technology. To be well matched with such image sensor, a lens system which is essentially comprised of a number of lenses, should be able to meet requirement such as, high resolution, low chromatic aberration, and long flange back. However, the existing lens system cannot meet those requirements, and thus resulting in poor imaging effect.

Therefore, what is needed, is a lens system, which can overcome the above shortcomings

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the views.

DETAILED DESCRIPTION

Embodiments of the disclosure will now be described in detail with reference to the drawings.

Figure 1:
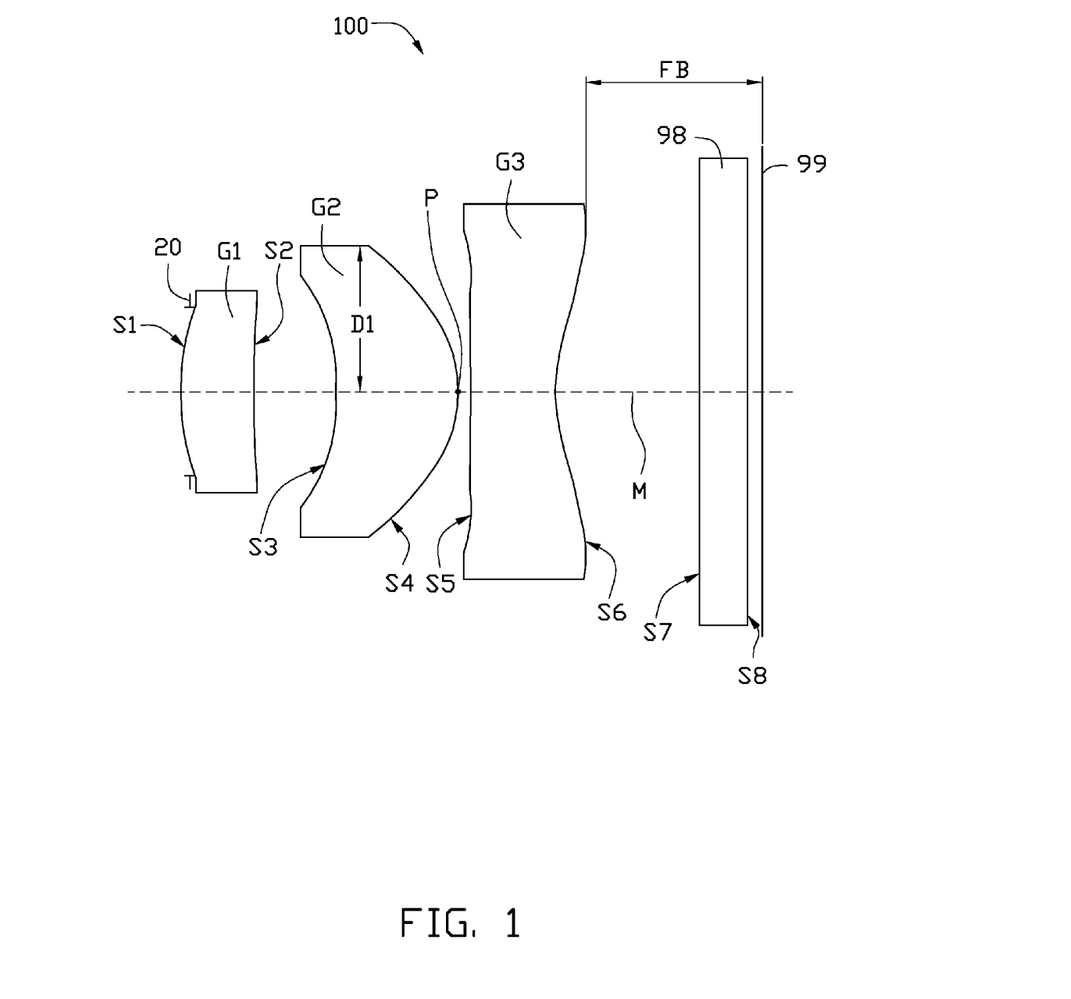
FIG. 1 is a schematic view of a lens system in accordance with a first embodiment or a second embodiment.

Referring to FIG. 1, a lens system 100, according to a first embodiment, includes, in an order from the object side to the image side thereof, an aperture stop 20, a first lens G1 of positive refractive power, a second lens G2 of positive refractive power, a third lens G3 of negative refractive power, and an image plane 99.

The first lens G1 has a first subject-side surface 51 (first surface 51) oriented towards the object side of the lens system 100, and a first image-side surface S2 (second surface S2) oriented towards the image side of the lens system 100. The second lens G2 has a second subject-side surface S3 (third surface S3) oriented towards the object side of the lens system 100, and a second image-side surface S4 (fourth surface S4) oriented towards the image side of the lens system 100. The third lens G3 has a third subject-side surface S5 (fifth surface S5) oriented towards the object side of the lens system 100, and a third image-side surface S6 (sixth surface S6) oriented towards the image side of the lens system 100.

The lens system 100 is configured for capturing an image. In operation, incident light rays of an object enter the lens system 100, transmit through the aperture stop 20, the first lens G1, the second lens G2, and the third lens G3, and thus reaching the image plane 99. An image sensor, such as a charge-coupled device (CCD) or a complementary metal oxide semiconductor device (CMOS) can be provided and arranged at the image plane 99 to sense the light rays, thus capturing the image of the object. In this embodiment, the lens system 100 further includes an infrared cut filter 98. The infrared cut filter 98 includes a seventh surface S7 oriented towards the object side of the lens system 100, and an eighth surface S8 oriented towards the image side of the lens system 100. Each of the seventh surface S7 and the eighth surface S8 is a plane surface.

The infrared cut filter 98 is arranged between the third lens G3 and the image plane 99 to eliminate infrared light on the image sensor, thus improving quality of the image captured by the image sensor.

The lens system 100 satisfies formulae: $FB/TTL>0.30$; $G1R2/F1>19.54$; and $D1/D2<1.62$. FB denotes a distance between a nearest point of the sixth surface S6 relative to the image plane 99, and the image plane 99 (see FIG. 1). TTL denotes the total track length of the lens system 100. G1R2 denotes the curvature radius of the vertex of the second surface S2. F1 denotes the focal length of the first lens G1. In addition, D1 denotes an orthogonal distance between a farthest point of the fourth surface S4 relative to an optical axis M of the lens system 100, and a central point P of the fourth surface S4 (the central point P is located in the optical axis M of the lens system 100), measured along a direction substantially perpendicular to the optical axis M of the lens system 100. D2 denotes an orthogonal distance between the farthest point of the fourth surface S4 and the central point P of the fourth surface S4, measured along a direction substantially parallel to the optical axis M of the lens system 100.

In one aspect, satisfying the formula $FB/TTL>0.30$, the lens system 100 has a long flange back. As such, the third lens G3 is far away from the image sensor, thus the image sensor avoids receiving scratches and particles In another aspect, satisfying the formula $G1R2/F1>19.54$, the lens system 100 has a relatively small focal power. In addition, satisfying the formula $D1/D2<1.62$, the lens system 100 has a relative high resolution while maintaining a relatively small chromatic aberration. The lens system 100 can be used in a portable electronic device, such as a mobile phone.

The first, the second, and the third lenses G1, G2, and G3 each can be made of plastic, polymer, or glass. In this embodiment, the first, the second, and the third lenses G1, G2, and G3 each are made of plastic, thus the lens system 100 is cost-efficient.

To obtain maximum resolution while maintaining a relatively small chromatic aberration, the lens system 100 may satisfy the formulae: $-0.34>G1R2/F2>G2R1/F2>-0.68$; $-0.42>G3R2/F3>G3R1/F3>-1.92$. G2R1 denotes the curvature radius of the vertex of the third surface S3. G2R2 denotes the curvature radius of the vertex of the fourth surface S4. G3R1 denotes the curvature radius of the vertex of the fifth surface S5. G3R2 denotes the curvature radius of the vertex of the sixth surface S6. F2 denotes the focal length of the second lens G2. F3 denotes the focal length of the third lens G3. In one aspect, satisfying the formula −0.34>G1R2/F2>G2R1/F2>−0.68, the lens system 100 has a balanced distribution for focal power. In another aspect, satisfying the formula −0.42>G3R2/F3>G3R1/F3>−1.92, a peripheral sag of the third lens G3 is relatively small, and the flange back of the lens system 100 is relatively long.

Furthermore, to correct chromatic aberration, and thus increasing the resolution, the lens system 100 can satisfy the formulae: Vd2>53, and Vd3<33. Vd2 is the Abbe number of the second lens G2, and Vd3 is the Abbe number of the second lens G3.

The first, the second, and the third lenses G1, G2, G3 each have two aspherical surfaces (that is, a subject-side aspherical surface and an image-side aspherical surface). Each aspherical surface is shaped according to the formula:

$$x = \frac{ch^2}{1 + \sqrt{1 - (k+1)c^2h^2}} + \sum A_i h^i,$$

wherein h is a height from the optical axis of the lens system 100 to the aspherical surface, c is a vertex curvature, k is a conic constant, and Ai are i-th order correction coefficients of the aspheric surface.

The following symbols are used:
F/No: F number;
2ω: field angle;
R: radius of curvature;
D: distance between surfaces on the optical axis of the lens system 100;
Nd: refractive index of lens of d light (wavelength: 587.6 nm); and
Vd: Abbe number of d light (wavelength: 587.6 nm).

In addition, the width of the aperture stop 20 can be omitted and the entire aperture stop 20 can be treated as a plane (or a surface) S0.

The lens system 100 of the first embodiment satisfies the tables 1-3.

TABLE 1

| Surface | R (mm) | D (mm) | Nd | Vd |
| --- | --- | --- | --- | --- |
| subject surface | Infinity | — | — | — |
| S0 | Infinity | −0.04 | — | — |
| S1 | 1.59 | 0.44 | 1.53 | 56.0 |
| S2 | 59.65 | 0.47 | — | — |
| S3 | −1.13 | 0.72 | 1.53 | 56.0 |
| S4 | −0.62 | 0.06 | — | — |
| S5 | 3.25 | 0.52 | 1.63 | 23.4 |
| S6 | 0.86 | 0.85 | — | — |
| S7 | Infinity | 0.30 | 1.52 | 58.6 |
| S8 | Infinity | 0.08 | — | — |
| Image plane 99 | Infinity | — | — | — |

TABLE 2

| Surface | Aspherical coefficient |
| --- | --- |
| S1 | K = 4.3480; A4 = −0.1404; A6 = −0.3103; A8 = 0.7103; A10 = −2.1641 |
| S2 | K = 0.0000; A4 = 0.0259; A6 = −0.2896; A8 = 1.8355; A10 = −1.6354 |
| S3 | K = −0.5150; A4 = 0.0528; A6 = −1.4223; A8 = 3.9463; A10 = −2.4050 |
| S4 | K = −2.6641; A4 = −0.4343; A6 = 0.1695; A8 = −0.0071; A10 = 0.1008 |
| S5 | K = 0.0000; A4 = −0.3171; A6 = 0.1164; A8 = 0.1188; A10 = −0.1543 |
| S6 | K = −6.7585; A4 = −0.2152; A6 = 0.1657; A8 = −0.0850; A10 = 0.0146 |

TABLE 3

| F (mm) | F/No | 2ω |
| --- | --- | --- |
| 2.38 | 2.46 | 61.69° |

Figure 2:
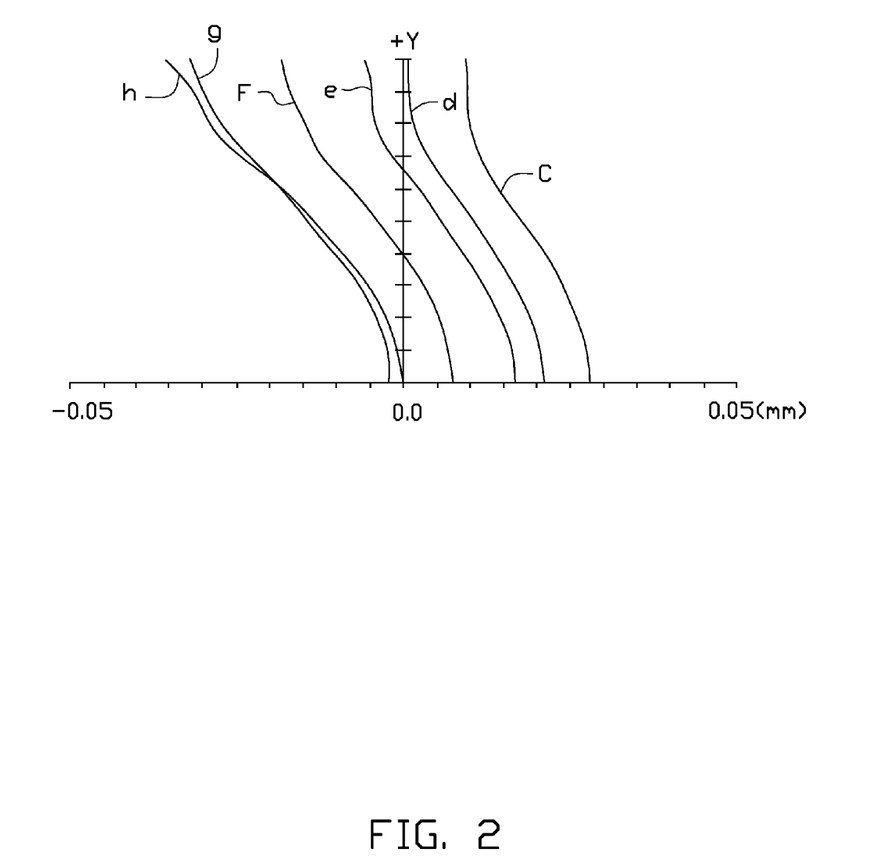
FIG. 2 is a graph showing spherical aberration of the lens system of FIG. 1, in accordance with the first embodiment.
Figure 3:
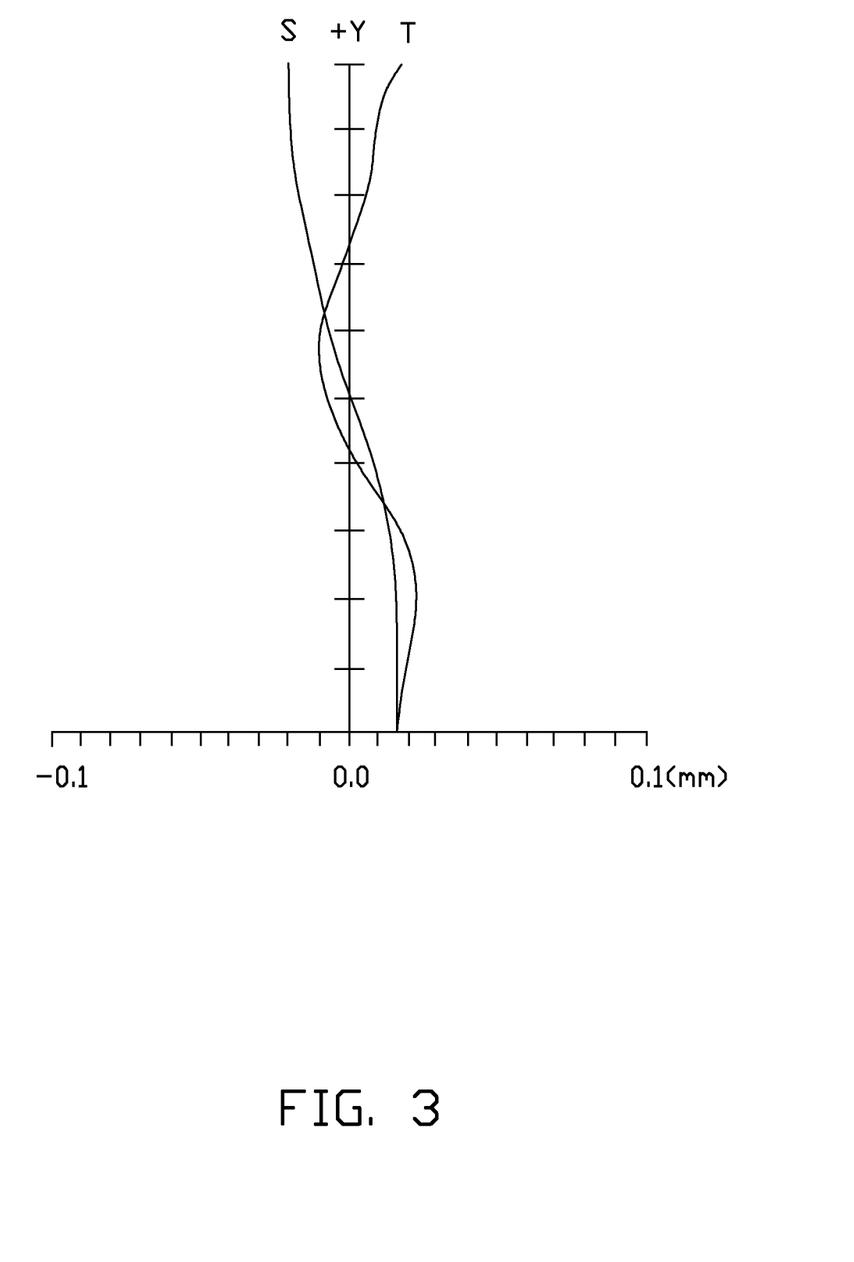
FIG. 3 is a graph showing field curvature of the lens system of FIG. 1, in accordance with the first embodiment.
Figure 4:
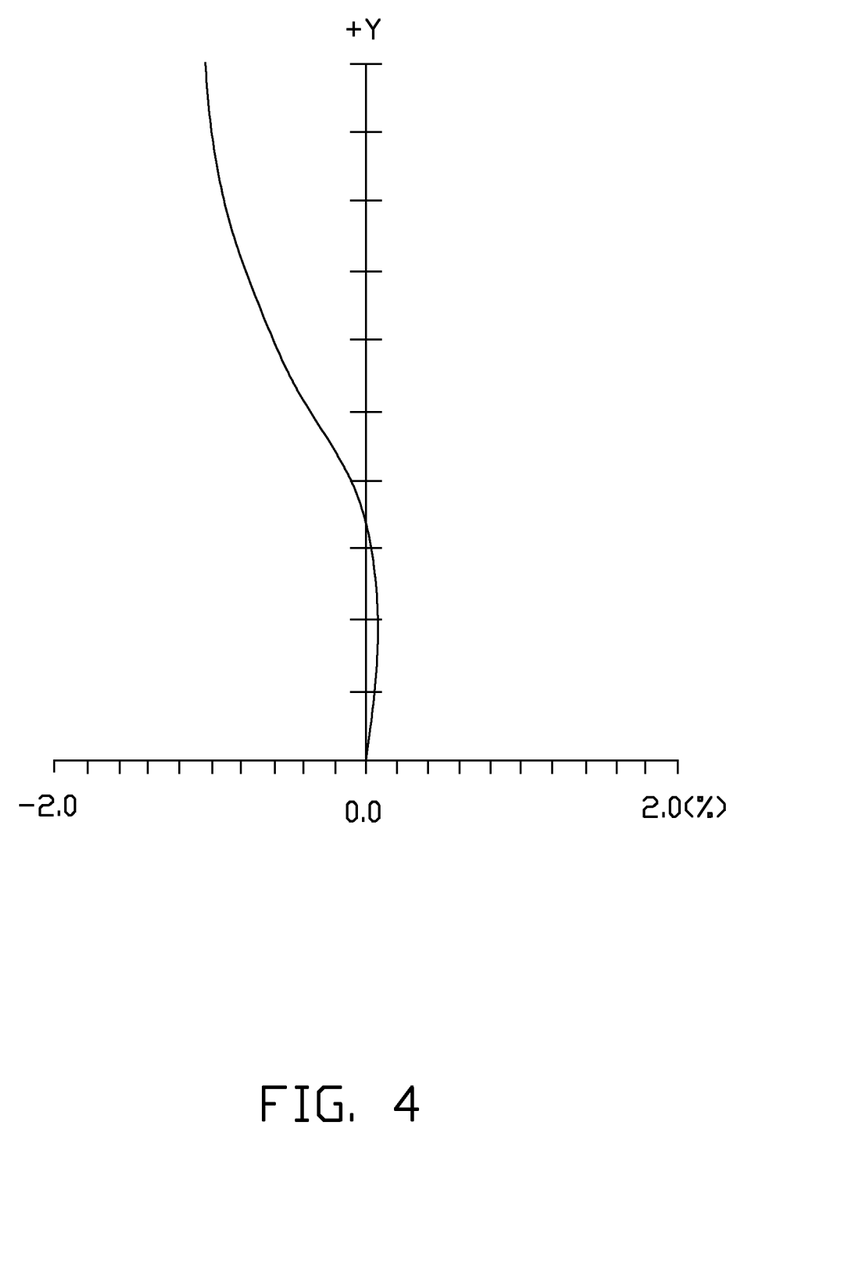
FIG. 4 is a graph showing distortion of the lens system of FIG. 1, in accordance with the first embodiment.
Figure 5:
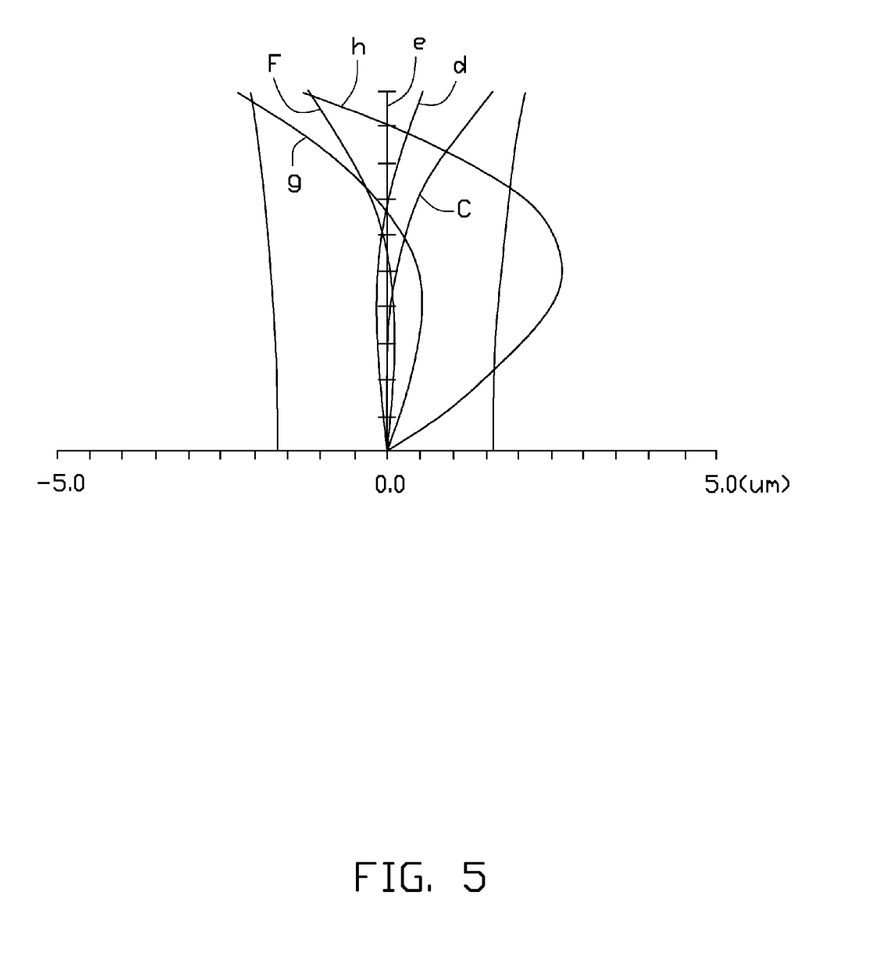
FIG. 5 is a graph showing chromatic aberration of the lens system of FIG. 1, in accordance with the first embodiment.
Figure 6:
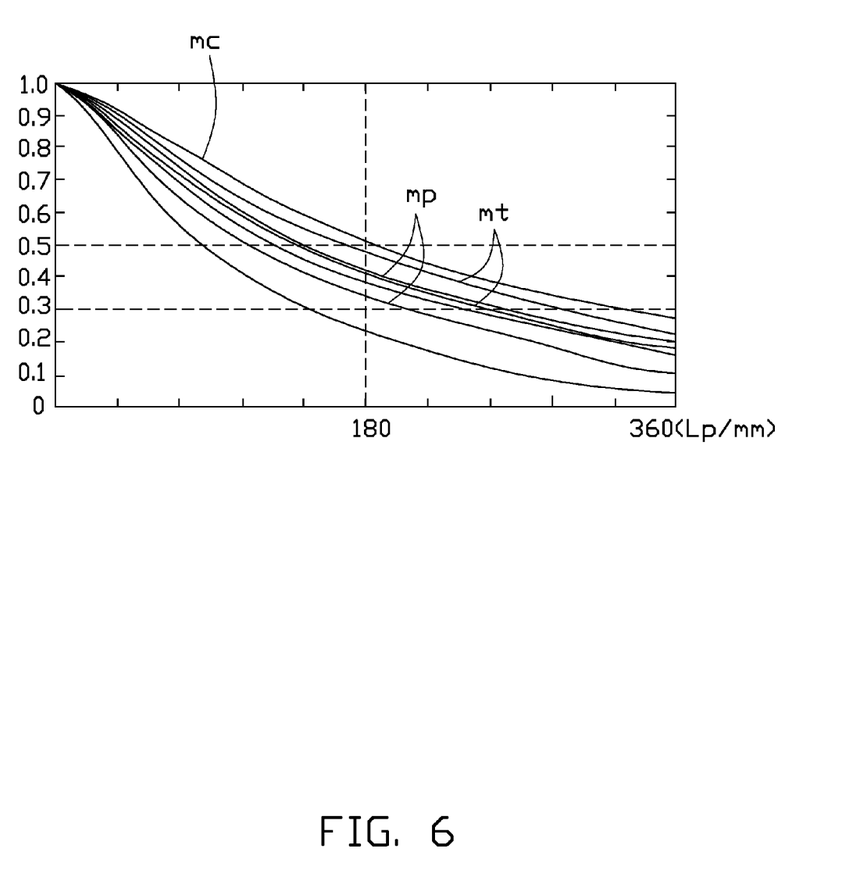
FIG. 6 is a graph showing modulation transfer function of the lens system of FIG. 1, in accordance with the first embodiment.

As shown in FIG. 2, the curves F, d, C, e, g, and h are respective spherical aberration characteristic curves of F light (wavelength: 486.1 nm), d light (wavelength: 587.6 nm), and C light (wavelength: 656.3 nm), e light (wavelength: 546.1 nm), g light (wavelength: 435.8 nm), and h light (wavelength: 404.7 nm) of the lens system 100 of the first embodiment. In this embodiment, spherical aberration of visible light (400-700 nm) of the lens system 100 is in a range of: −0.05 mm~0.05 mm. As shown in FIG. 3, the curves T and S are the tangential field curvature curve and the sagittal field curvature curve, respectively. In this embodiment, field curvature of the lens system 100 is limited to a range of: −0.10 mm~0.10 mm. In addition, as shown in FIG. 4, optical distortion of the lens system 100 is limited in a range of: −2.00%~2.00%. Furthermore, as shown in FIG. 5, the curves F, d, C, e, g, and h are respective chromatic aberration characteristic curves of F light (wavelength: 486.1 nm), d light (wavelength: 587.6 nm), and C light (wavelength: 656.3 nm), e light (wavelength: 546.1 nm), g light (wavelength: 435.8 nm), and h light (wavelength: 404.7 nm) of the lens system 100 of the first embodiment. In this embodiment, chromatic aberration of visible light (400-700 nm) of the lens system 100 is in a range of: −5 μm~5 μm, and the h light (wavelength: 404.7 nm) of the lens system 100 has a greatest chromatic aberration along all the curves F, d, C, e, g, and h, which is in a range of: −2.8 μm~2.8 μm. Moreover, as shown in FIG. 6, for half of the Nyquist frequency (about 180 lp/mm), the MTF of the central field is greater than 50% (see curve mc), the MTF of the 0.8 field is greater than 30% (see curve mp), the MTF between the central field and the 0.8 field is in a range of: 30%~50% (see curve mt, for example). Overall, in this embodiment, the lens system 100 achieves large field angle (2ω>61.69°).

Referring to FIG. 1, and FIG. 7 to FIG. 11, a lens system 100, according to a second embodiment, is essentially similar to that of the first embodiment in structure but satisfies tables 4-6 instead of tables 1-3.

TABLE 4

| Surface | R (mm) | D (mm) | Nd | Vd |
| --- | --- | --- | --- | --- |
| subject surface | Infinity | — | — | — |
| S0 | Infinity | −0.04 | — | — |
| S1 | 1.61 | 0.42 | 1.53 | 56.0 |
| S2 | 96.38 | 0.46 | — | — |
| S3 | −1.09 | 0.72 | 1.53 | 56.0 |
| S4 | −0.61 | 0.06 | — | — |
| S5 | 3.80 | 0.56 | 1.63 | 23.4 |

TABLE 4-continued

| Surface | R (mm) | D (mm) | Nd | Vd |
|---|---|---|---|---|
| S6 | 0.90 | 0.85 | — | — |
| S7 | Infinity | 0.30 | 1.52 | 58.6 |
| S8 | Infinity | 0.08 | — | — |
| Image plane 99 | — | — | — | — |

TABLE 5

| Surface | Aspherical coefficient |
|---|---|
| S1 | K = −1.1020; A4 = 0.1169; A6 = −1.6129; A8 = 14.8416; A10 = −65.9129; A12 = 127.8967; A14 = −45.9958 |
| S2 | K = 0.0000; A4 = 0.0174; A6 = 0.3375; A8 = −5.1044; A10 = 46.3957; A12 = −158.3426; A14 = 206.4591 |
| S3 | K = −0.3382; A4 = −0.0244; A6 = −1.1042; A8 = 3.5916; A10 = −3.2853; A12 = 3.4719; A14 = −0.7922 |
| S4 | K = −1.7801; A4 = −0.1036; A6 = −0.6091; A8 = 0.9240; A10 = 0.2456; A12 = −1.7606; A14 = 1.4325 |
| S5 | K = 0.0000; A4 = −0.2910; A6 = 0.0127; A8 = 0.4628; A10 = −0.7876; A12 = 0.5803; A14 = −0.2131 |
| S6 | K = −6.8201; A4 = −0.2173; A6 = 0.1796; A8 = −0.1155; A10 = 0.0463; A12 = −0.0141; A14 = 0.0021 |

TABLE 6

| F (mm) | F/No | 2ω |
|---|---|---|
| 2.39 | 2.82 | 61.67° |

Figure 7:
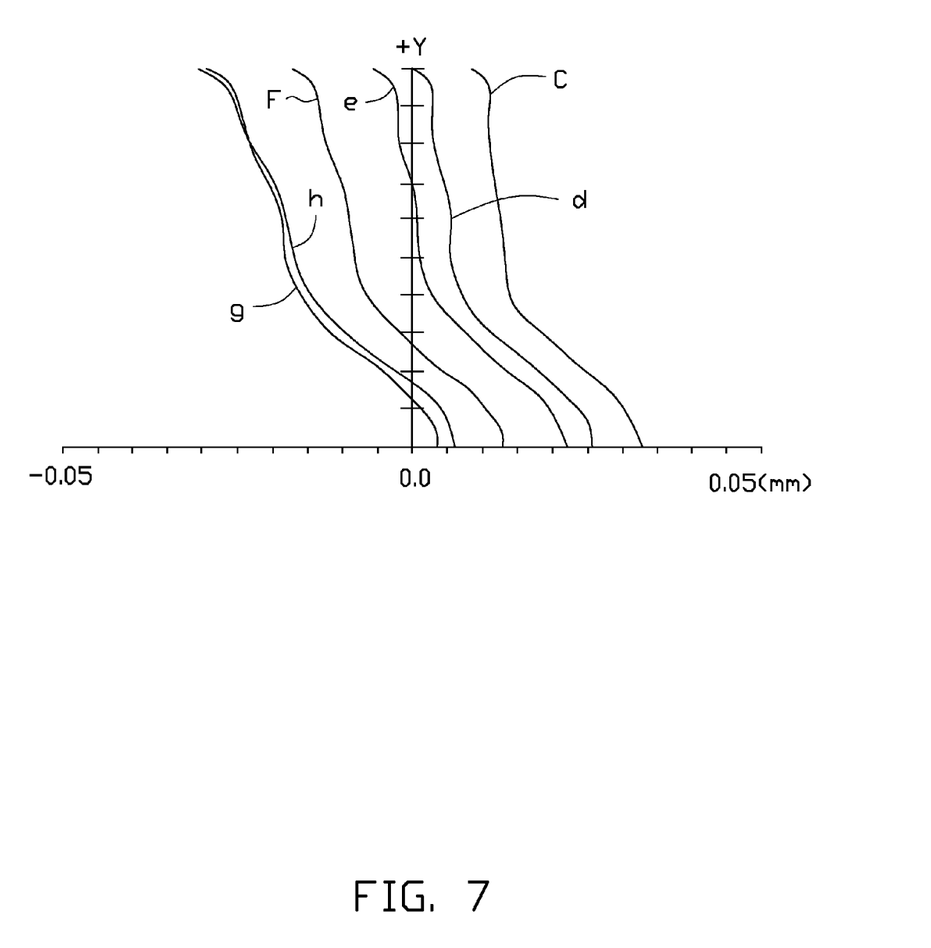
FIG. 7 is a graph showing spherical aberration of the lens system of FIG. 1, in accordance with the second embodiment.
Figure 8:
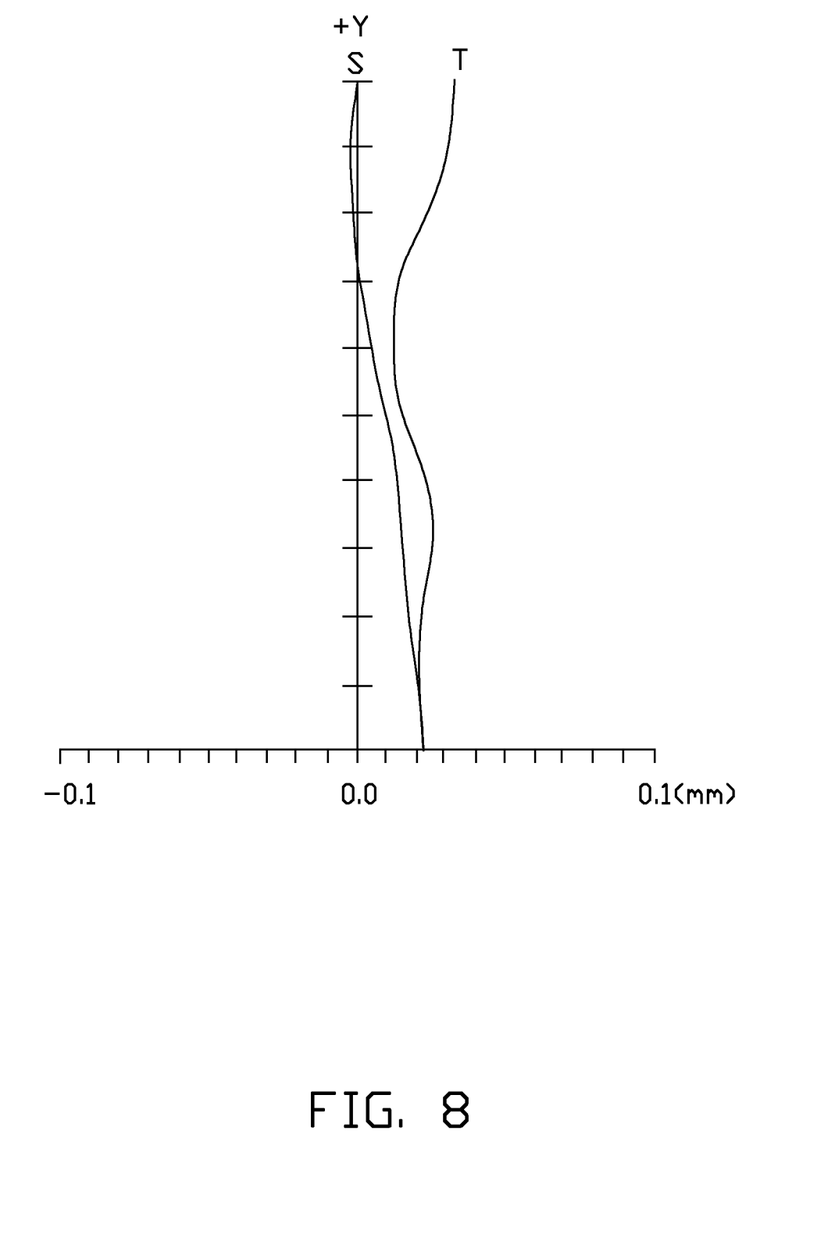
FIG. 8 is a graph showing field curvature of the lens system of FIG. 1, in accordance with the second embodiment.
Figure 9:
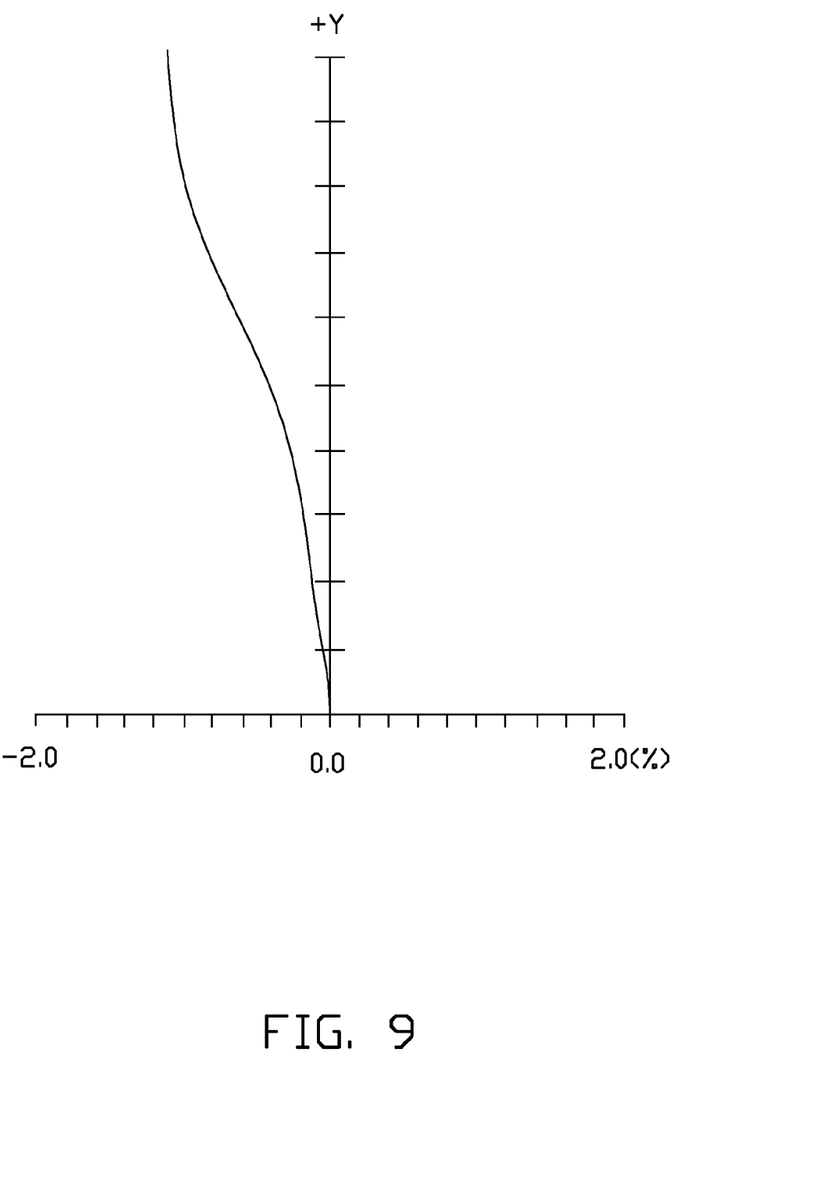
FIG. 9 is a graph showing distortion of the lens system of FIG. 1, in accordance with the second embodiment.
Figure 10:
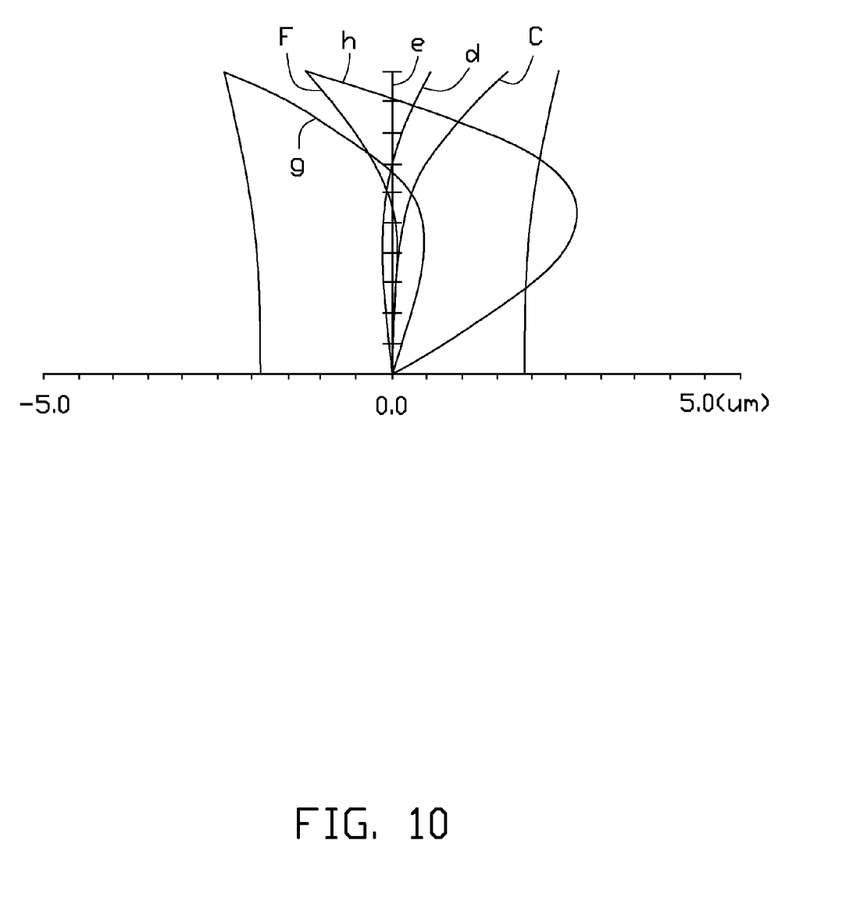
FIG. 10 is a graph showing chromatic aberration of the lens system of FIG. 1, in accordance with the second embodiment.
Figure 11:
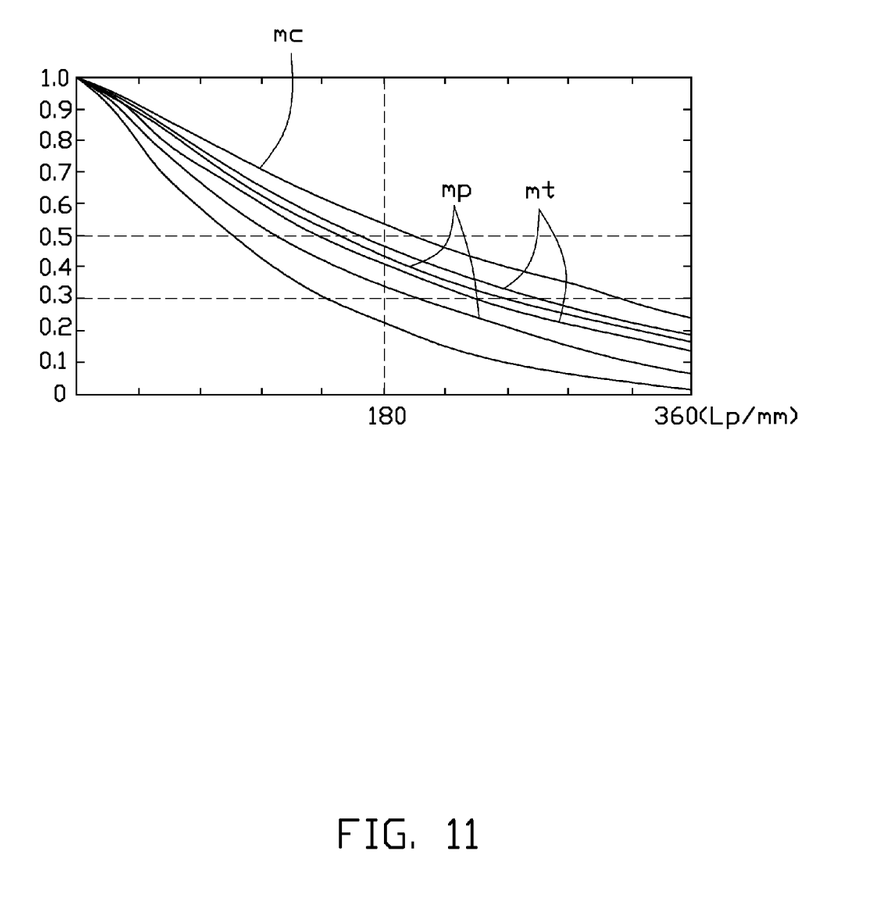
FIG. 11 is a graph showing modulation transfer function of the lens system of FIG. 1, in accordance with the second embodiment.

As shown in FIG. 7, the curves F, d, C, e, g, and h are respective spherical aberration characteristic curves of F light (wavelength: 486.1 nm), d light (wavelength: 587.6 nm), and C light (wavelength: 656.3 nm), e light (wavelength: 546.1 nm), g light (wavelength: 435.8 nm), and h light (wavelength: 404.7 nm) of the lens system 100 of the second embodiment. In this embodiment, spherical aberration of visible light (400-700 nm) of the lens system 100 is in a range of: −0.05 mm~0.05 mm. As shown in FIG. 8, the curves T and S are the tangential field curvature curve and the sagittal field curvature curve, respectively. In this embodiment, field curvature of the lens system 100 is limited to a range of: −0.10 mm~0.10 mm. In addition, as shown in FIG. 9, optical distortion of the lens system 100 is limited in a range of: −2.00%~0. Furthermore, as shown in FIG. 10, the curves F, d, C, e, g, and h are respective chromatic aberration characteristic curves of F light (wavelength: 486.1 nm), d light (wavelength: 587.6 nm), and C light (wavelength: 656.3 nm), e light (wavelength: 546.1 nm), g light (wavelength: 435.8 nm), and h light (wavelength: 404.7 nm) of the lens system 100 of the second embodiment. In this embodiment, chromatic aberration of visible light (400-700 nm) of the lens system 100 is in a range of: −5 µm~5 µm, and the h light (wavelength: 404.7 nm) of the lens system 100 has a greatest chromatic aberration among all the curves F, d, C, e, g, and h, which is in a range of: −2.8 µm~2.8 µm. Moreover, as shown in FIG. 11, for half of the Nyquist frequency (about 180 lp/mm), the MTF of the central field is greater than 50% (see curve mc), the MTF of the 0.8 field is greater than 30% (see curve mp), the MTF between the central field and the 0.8 field is in a range of: 30%~50% (see curve mt, for example). Overall, in this embodiment, the lens system 100 achieve large field angle (2ω>61.67°).

It is understood that the above-described embodiments are intended to illustrate rather than limit the disclosure. Variations may be made to the embodiments without departing from the spirit of the disclosure. Accordingly, it is appropriate that the appended claims be construed broadly and in a manner consistent with the scope of the disclosure.

What is claimed is:

1. A lens system, in an order from the object side thereof to the image side thereof, comprising:
    an aperture stop;
    a first lens of positive refractive power having a first subject-side surface and a first image-side surface;
    a second lens of positive refractive power having a second subject-side surface and a second image-side surface;
    a third lens of negative refractive power having a third subject-side surface and a third image-side surface; and
    an image plane;
    the lens system satisfying the following formulae: $FB/TTL>0.30$; $G1R2/F1>19.54$; and $D1/D2<1.62$, wherein FB denotes a distance between a nearest point of the third image-side surface relative to the image plane and the image plane; TTL denotes the total track length of the lens system; G1R2 denotes the curvature radius of the vertex of the first image-side surface; F1 denotes the focal length of the first lens; D1 denotes an orthogonal distance between a farthest point of the second image-side surface relative to an optical axis of the lens system and a central point of the second image-side surface on the optical axis of the lens system, measured along a direction substantially perpendicular to the optical axis of the lens system; D2 denotes an orthogonal distance between the farthest point of the second image-side surface and the central point of the second image-side surface on the optical axis of the lens system, measured along a direction substantially parallel to the optical axis of the lens system;
    the lens system further satisfying the following formulae: $-0.34>G1R2/F2>G2R1/F2>-0.68$; $-0.42>G3R2/F3>G3R1/F3>-1.92$; wherein G2R1 denotes the curvature radius of the vertex of the second subject-side surface, G3R1 denotes the curvature radius of the vertex of the third subject-side surface, G3R2 denotes the curvature radius of the vertex of the third image-side surface, F2 denotes the focal length of the second lens, F3 denotes the focal length of the third lens.

2. The lens system of claim 1, further satisfying the following formulae: $Vd2>53$; and $Vd3<33$, wherein Vd2 denotes the Abbe number of the second lens, and Vd3 denotes the Abbe number of the third lens.

3. The lens system of claim 1, wherein each of the first subject-side surface, the first image-side surface, the second subject-side surface, the second image-side surface, the third subject-side surface, and the third image-side surface is an aspherical surface.

4. The lens system of claim 1, wherein each of the first, the second, and the third lenses is comprised of plastic, polymer, or glass.

5. The lens system of claim 1, further comprising an infrared cut filter, the infrared cut filter being arranged between the third lens and the image plane of the lens system.

* * * * *